US010815447B2

(12) United States Patent
Aoyama

(10) Patent No.: US 10,815,447 B2
(45) Date of Patent: Oct. 27, 2020

(54) ELECTRIC VEHICLE OR HYBRID VEHICLE LUBRICATING OIL COMPOSITION

(71) Applicant: IDEMITSU KOSAN CO., LTD., Chiyoda-ku (JP)

(72) Inventor: Kayoko Aoyama, Sapporo (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/561,538

(22) PCT Filed: Jan. 25, 2016

(86) PCT No.: PCT/JP2016/051983
§ 371 (c)(1),
(2) Date: Sep. 26, 2017

(87) PCT Pub. No.: WO2016/157958
PCT Pub. Date: Oct. 6, 2016

(65) Prior Publication Data
US 2018/0079990 A1 Mar. 22, 2018

(30) Foreign Application Priority Data
Mar. 31, 2015 (JP) .................. 2015-074422

(51) Int. Cl.
| *C10M 169/04* | (2006.01) |
| *C10M 149/18* | (2006.01) |
| *C10M 107/02* | (2006.01) |
| *C10M 129/74* | (2006.01) |
| *C10M 161/00* | (2006.01) |
| C10N 20/02 | (2006.01) |
| C10N 30/02 | (2006.01) |
| C10N 40/04 | (2006.01) |
| C10N 40/22 | (2006.01) |
| F16H 57/04 | (2010.01) |

(52) U.S. Cl.
CPC ...... *C10M 169/044* (2013.01); *C10M 107/02* (2013.01); *C10M 129/74* (2013.01); *C10M 149/18* (2013.01); *C10M 161/00* (2013.01); *C10M 169/04* (2013.01); C10M 2205/0206 (2013.01); C10M 2205/0285 (2013.01); C10M 2207/283 (2013.01); C10M 2209/084 (2013.01); C10M 2217/044 (2013.01); C10N 2020/02 (2013.01); C10N 2030/02 (2013.01); C10N 2040/04 (2013.01); C10N 2040/22 (2013.01); F16H 57/0473 (2013.01); F16H 57/0476 (2013.01)

(58) Field of Classification Search
CPC .............. C10M 169/044; C10M 169/04
See application file for complete search history.

(56) References Cited

U.S. PATENT DOCUMENTS

| 5,395,539 A * | 3/1995 | Chandler | C10M 133/16 252/77 |
| 5,916,852 A * | 6/1999 | Nibert | C10M 141/10 508/432 |
| 6,051,536 A | 4/2000 | Igarashi et al. | |
| 2004/0014619 A1 | 1/2004 | Saputra et al. | |
| 2004/0209786 A1 | 10/2004 | Sagawa et al. | |
| 2008/0194442 A1* | 8/2008 | Watts | C10M 141/10 508/272 |
| 2009/0312207 A1* | 12/2009 | Bartley | C10M 141/10 508/161 |
| 2010/0130390 A1* | 5/2010 | Tipton | C10M 141/10 508/162 |
| 2011/0177989 A1* | 7/2011 | Bouffet | C10M 169/041 508/507 |
| 2013/0196888 A1* | 8/2013 | Truong-Dinh | C10M 161/00 508/364 |
| 2014/0018271 A1* | 1/2014 | Onumata | C10M 141/10 508/433 |
| 2017/0204046 A1* | 7/2017 | Kishi | C07C 69/33 |

FOREIGN PATENT DOCUMENTS

| CN | 102171320 A | 8/2011 |
| CN | 103097503 A | 5/2013 |
| CN | 103443256 A | 12/2013 |
| JP | 60-173097 A | 9/1985 |
| JP | 1-271494 A | 10/1989 |
| JP | 2-46635 B2 | 10/1990 |
| JP | 6-145683 A | 5/1994 |
| JP | 9-263782 A | 10/1997 |
| JP | 2003-82375 A | 3/2003 |

(Continued)

OTHER PUBLICATIONS

International Search Report dated Feb. 23, 2016 in PCT/JP2016/051983 filed Jan. 25, 2016.
Office Action dated Mar. 5, 2019 in the corresponding Japanese Patent Application No. 2015-074422 with Unedited Computer-Generated English Translation 11 pages.
Office Action dated Sep. 24, 2019, in Japanese Patent Application No. 2015-074422, filed Mar. 31, 2015 (with English Translation).
Combined Chinese Office Action and Search Report dated Mar. 16, 2020 in corresponding Chinese Patent Application No. 201680018979.2 (with English Translation and English Translation of Category of Cited Documents), 19 pages.

(Continued)

*Primary Examiner* — Ellen M McAvoy
(74) *Attorney, Agent, or Firm* — Oblon, McClelland, Maier & Neustadt, L.L.P.

(57) ABSTRACT

Provided is a lubricating oil composition for electric vehicle or hybrid vehicle having excellent gear properties, clutch properties, cooling properties, and electric insulating properties. The lubricating oil composition for electric vehicle or hybrid vehicle preparing by blending (A) a base oi and (B-1) a polyamide and/or (B-2) a polyol ester, the base oil (A) including (A-1) a synthetic oil having a kinematic viscosity at 100° C. of 1.0 to 10.0 $mm^2/s$.

8 Claims, No Drawings

(56) References Cited

FOREIGN PATENT DOCUMENTS

| | | |
|---|---|---|
| JP | 2008-208221 A | 9/2008 |
| JP | 2008-285682 A | 11/2008 |
| JP | 2010-521559 A | 6/2010 |
| JP | 2011-148970 A | 8/2011 |
| JP | 2011-168677 A | 9/2011 |
| JP | 2012-031359 A | 2/2012 |
| JP | 2012-504677 A | 2/2012 |
| JP | 2014-169460 A | 9/2014 |

OTHER PUBLICATIONS

Office Action dated Aug. 7, 2020, in CN Application No. 201680018979.2 with English translation (17 pages).

\* cited by examiner

ELECTRIC VEHICLE OR HYBRID VEHICLE LUBRICATING OIL COMPOSITION

CROSS-REFERENCE TO RELATED APPLICATIONS

This application is a National Stage of PCT/JP2016/051983, which was filed on Jan. 25, 2016. This application is based upon and claims the benefit of priority to Japanese Application No. 2015-074422, which was filed on Mar. 31, 2015.

TECHNICAL FIELD

The present invention relates to a lubricating oil composition for electric vehicle or hybrid vehicle.

BACKGROUND ART

Hitherto, a lubricating oil composition for a transmission has been required to have gear properties and clutch properties.

The gear properties indicate, for example, seizure resistance or shear stability under a high load. In addition, the clutch properties indicate, for example, suppression of shift shock generated when a coefficient of friction increases at the time of clutch connection.

In addition, in recent years, with the spread of hybrid vehicles or electric cars, a lubricating oil composition for motor cooling is used, too. Since there is a case where such a lubricating oil composition comes into direct contact with a motor and cools it, or the like, the lubricating oil composition is required to have high insulating properties together with cooling properties.

In addition, in recent years, it is also required to make a lubricating oil composition have a combination of plural applications. For example, there is exemplified a case where by providing a lubricating oil composition for a transmission with cooling properties and insulating properties, the lubricating oil composition is made to have a combined use for a transmission and motor cooling. Such a lubricating oil composition can be expected to be used as a lubricating oil composition for electric vehicle or hybrid vehicle.

As general lubricating oil compositions for a transmission, technologies of PTLs 1 to 3 are proposed.

CITATION LIST

Patent Literature

PTL 1: JP 2-46635 A
PTL 2: JP 2008-208221 A
PTL 3: JP 2011-168677 A

DISCLOSURE OF INVENTION

Technical Problem

PTL 1 proposes a lubricating oil composition for a wet clutch or a wet brake containing a specified phosphoric acid ester amine salt and a specified fatty acid ester. The lubricating oil composition of PTL 1 is one realizing performances, such as good friction properties, thermal oxidative stability, corrosion resistance, rust preventing properties, etc.

PTL 2 proposes a lubricating oil composition for an automobile transmission containing an ethylene-propylene copolymer having a specified viscosity in a base oil having a specified viscosity. The lubricating oil composition of PTL 2 is one realizing a low viscosity as well as an excellent fatigue life.

PTL 3 proposes a lubricating oil composition for a continuously variable transmission containing a poly-α-olefin having specified properties and a polymethacrylate having a specified mass average molecular weight. The lubricating oil composition of PTL 3 is one realizing a low viscosity, a high viscosity index, a stable shear stability, and a long fatigue life.

However, all of the lubricating oil compositions of PTLs 1 to 3 could not be simultaneously satisfied with gear properties, clutch properties, cooling properties, and electric insulating properties.

An object of the present invention is to provide a lubricating oil composition for electric vehicle or hybrid vehicle having excellent gear properties, clutch properties, cooling properties, and electric insulating properties.

Solution to Problem

In order to solve the aforementioned problem, the present invention provides a lubricating oil composition for electric vehicle or hybrid vehicle, which preparing by blending (A) a base oil and (B-1) a polyamide and/or (B-2) a polyol ester, the base oil (A) including (A-1) a synthetic oil having a kinematic viscosity at 100° C. of 1.0 to 10.0 mm$^2$/s.

Advantageous Effects of Invention

The lubricating oil composition for electric vehicle or hybrid vehicle of the present invention is able to simultaneously satisfy gear properties (e.g., seizure resistance or shear stability under a high load), clutch properties (e.g., suppression of shift shock at the time of clutch connection), cooling properties, and electric insulating properties.

DESCRIPTION OF EMBODIMENTS

An embodiment of the present invention (hereinafter also referred to as "present embodiment") is hereunder described.

The lubricating oil composition for electric vehicle or hybrid vehicle of the present embodiment is one preparing by blending (A) a base oil and (B-1) a polyamide and/or (B-2) a polyol ester, the base oil (A) including (A-1) a synthetic oil having a kinematic viscosity at 100° C. of 1.0 to 10.0 mm$^2$/s.

In the present embodiment, the composition prescribed as the "composition preparing by blending the component (A) and the component (B-1) and/or the component (B-2)" includes not only a "composition including the component (A) and the component (B-1) and/or the component (B-2)" but also a "composition including a modified product resulting from modification of at least one component of the component (A) and the component (B-1) and/or the component (B-2) in place of the foregoing component" or a "composition including a reaction product resulting from reaction of the component (A) and the component (B-1) and/or the component (B-2)".

<(A) Base Oil>

The lubricating oil composition for electric vehicle or hybrid vehicle of the present embodiment is one including a base oil as the component (A) blended therein. Examples of the base oil as the component (A) include a mineral oil and a synthetic oil. In the present embodiment, it is required to include (A-1) a synthetic oil having a kinematic viscosity at 100° C. of 1.0 to 10.0 mm²/s as the component (A).

In the case where the component (A-1) is not included as the base oil as the component (A), the shear stability is lowered, so that the gear properties cannot be made excellent, and furthermore, the shift shock at the time of clutch connection is generated, so that the clutch properties cannot be made satisfactory. In addition, in the case where the component (A-1) is not included, the cooling properties are insufficient, so that an increase of the viscosity in a low-temperature environment cannot be suppressed. On the other hand, when the component (A-1) is included as the base oil as the component (A), the gear properties and the clutch properties can be made excellent. Furthermore, when the component (A-1) is included, not only the cooling properties can be made excellent, but also the increase of the viscosity in a low-temperature environment can be suppressed.

In order to make it easy to exhibit an effect based on the aforementioned component (A-1), in the synthetic oil as the component (A-1), it is preferred that a kinematic viscosity at 100° C. and a kinematic viscosity at 40° C. fall within the following ranges, respectively.

The kinematic viscosity at 100° C. is preferably 1.1 to 5.0 mm²/s, and more preferably 1.2 to 2.5 mm²/s. The kinematic viscosity at 40° C. is preferably 2.0 to 20.0 mm²/s, more preferably 3.0 to 10.0 mm²/s, and still more preferably 4.0 to 6.0 mm²/s.

In the present embodiment, the kinematic viscosity and the viscosity index are those as measured in conformity with JIS K2283:2000.

Examples of the synthetic oil as the component (A-1) include a poly-α-olefin, such as polybutene, polyisobutylene, a 1-octene oligomer, a 1-decene oligomer, an ethylene-propylene copolymer, etc., a hydrogenated product of a poly-α-olefin, a polyphenyl ether, an alkylbenzene, an alkylnaphthalene, an ester oil, a glycol-based or polyolefin-based synthetic oil, and the like. Among those, from the viewpoint of making the gear properties excellent, a poly-α-olefin and/or a hydrogenated product of a poly-α-olefin is suitable.

The α-olefin serving as a raw material of the poly-α-olefin may be either linear or branched.

The α-olefin serving as a raw material of the poly-α-olefin has preferably 8 to 20 carbon atoms, and more preferably 8 to 12 carbon atoms. Among those, 1-decene having 10 carbon atoms is suitable.

The blending amount of the component (A-1) is preferably 1.0 to 10.0% by mass, more preferably 1.5 to 7.0% by mass, and still more preferably 2.0 to 5.0% by mass on the basis of the total amount of the lubricating oil composition for electric vehicle or hybrid vehicle. When the blending amount of the component (A-1) is 1.0% by mass or more, not only the gear properties, the clutch properties, and the cooling properties can be made excellent, but also an increase of the viscosity in a low-temperature environment can be suppressed. In addition, when the blending amount of the component (A-1) is 10.0% by mass or less, deterioration of the gear properties to be caused due to an excessive reduction of the viscosity can be suppressed.

In addition, the blending amount of the component (A-1) is preferably 1.5 to 12.0% by mass, more preferably 2.0 to 10.0% by mass, and still more preferably 2.5 to 5.0% by mass on the basis of the total amount of the component (A).

The lubricating oil composition for electric vehicle or hybrid vehicle of the present embodiment may include a base oil other than the component (A-1) as the base oil as the component (A).

As such a base oil, a mineral oil, or a synthetic oil whose kinematic viscosity at 100° C. falls outside the range of 1.0 to 10.0 mm²/s, is exemplified.

Examples of the mineral oil include a paraffin-based mineral oil, an intermediate mineral oil, and a naphthene-based mineral oil, each of which is obtained through a usual refining method, such as solvent refining, hydrogenation refining, etc., and the like; a wax isomerized oil which is produced through isomerization of a wax, such as a wax produced by the Fischer-Tropsch process (gas-to-liquid wax), a mineral oil-based wax, etc.; and the like.

The mineral oil is preferably one having a kinematic viscosity at 40° C. in the range of 5 to 50 mm²/s and a kinematic viscosity at 100° C. in the range of 1.5 to 6 mm²/s.

The blending amount of the mineral oil is preferably 60.0 to 90.0% by mass, preferably 60.0 to 80.0% by mass, and still more preferably 65.0 to 75.0% by mass on the basis of the total amount of the lubricating oil composition for electric vehicle or hybrid vehicle.

The blending amount of the base oil as the component (A) is preferably 70 to 98% by mass, more preferably 70 to 90% by mass, and still more preferably 75 to 85% by mass on the basis of the total amount of the lubricating oil composition for electric vehicle or hybrid vehicle.

<(B-1) Polyamide and (B-2) Polyol Ester>

The lubricating oil composition for electric vehicle or hybrid vehicle of the present embodiment is one including (B-1) a polyamide and/or (B-2) a polyol ester blended therein.

In the case where the polyamide (B-1) and/or the polyol ester (B-2) is not blended in the lubricating oil composition for electric vehicle or hybrid vehicle, the shift shock is generated at the time of clutch connection, so that the clutch properties cannot be made excellent. On the other hand, by blending the polyamide (B-1) and/or the polyol ester (B-2) in the lubricating oil composition for electric vehicle or hybrid vehicle, the clutch properties can be made excellent.

In the lubricating oil composition for electric vehicle or hybrid vehicle of the present invention, though at least one of the polyamide (B-1) and the polyol ester (B-2) has only to be blended, in the case where both of the polyamide (B-1) and the polyol ester (B-2) are blended, such is suitable from the standpoint that the clutch properties can be made more excellent.

Examples of the polyamide as the component (B-1) include amide compounds obtained through reaction between an amine compound and a carboxylic acid compound.

Examples of the amine compound that constitutes the polyamide (B-1) include aliphatic polyamines.

In the aliphatic polyamine, its total carbon number is preferably 6 to 30, more preferably 12 to 24, and still more preferably 16 to 20.

Specific examples of the aliphatic polyamine include hexamethylenediamine, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 1,21-diaminoheneicosane, 1,22-diaminodocosane, 1,23-diaminotricosane, 1,24-diaminotetracosane, 1,25-diaminopentacosane, 1,26-diaminohexacosane, 1,27-diaminoheptacosane, 1,28-diaminooctacosane, 1,29-diaminononacosane, 1,30-diaminotriacontane, hexenyldiamine, heptenyldiamine, octenyldiamine, nonenyldiamine, decenyldiamine, undecenyldiamine, dodecenyldiamine, tridecenyldiamine, tetradecenyldiamine, pentadecenyldiamine, hexadecenyldiamine, heptadecenyldiamine, octadecenyldiamine, nonadecenyldiamine, eicosenyldiamine, heneicosenyldiamine, docosenyldiamine, tricosenyldiamine, tetracosenyldiamine, pentacosenyldiamine, hexacosenyldiamine, heptacosenyldiamine, octacosenyldiamine, nonacosenyldiamine, triacontenyldiamine, triethylenetetramine, tetraethylenepentamine, pentaethylenehexamine, di(methylethylene)triamine, clibutylenetriamine, tributylenetetramine, pentapentylenehexamine, tris(2-aminoethyl)amine, and the like.

In the carboxylic acid compound that constitutes the polyamide (B-1), the carbon number of the hydrocarbon group is preferably 6 to 30, more preferably 8 to 24, still more preferably 12 to 24, and yet still more preferably 18 to 22.

In addition, the carboxylic acid component that constitutes the polyamide (B-1) is preferably a monovalent fatty acid. The foregoing fatty acid may be either linear or branched, and may be either saturated or unsaturated.

Examples of such a carboxylic acid compound include saturated fatty acids, such as caproic acid, enanthic acid, caprylic acid, 2-ethylhexanoic acid, pelargonic acid, capric acid, lauric acid, myristic acid, palmitic acid, margaric acid, stearic acid, isostearic acid, arachidic acid, behenic acid, lignoceric acid, etc.; and unsaturated fatty acids, such as lauric acid, myristoleic acid, palmitoleic acid, oleic acid, linoleic acid, erucic acid, etc.

From the viewpoint of making the clutch properties excellent, the polyamide as the component (B-1) preferably has a molecular weight of 1,000 or less.

Examples of the polyol ester as the component (B-2) include esters obtained through reaction between a polyol and a carboxylic acid compound.

In addition, though the polyol ester as the component (B-2) may be either a fully esterified compound or a partial ester, from the viewpoint of making the clutch properties excellent, a partial ester is preferred.

The polyol that constitutes the polyol ester (B-2) is preferably an aliphatic polyol having 2 to 15 carbon atoms, and more preferably an aliphatic polyol having 2 to 8 carbon atoms.

Specific examples of the polyol include ethylene glycol, propylene glycol, butylene glycol, neopentyl glycol, trimethylolethane, ditrimethylolethane, trimethylolpropane, ditrimethylolpropane, glycerin, pentaerythritol, dipentaerythritol, tripentaerythritol, sorbitol, and the like. Among those, from the viewpoint of making the clutch properties excellent, trivalent or multivalent aliphatic polyols are suitable, and above all, glycerin is suitable.

As the carboxylic acid compound that constitutes the polyol ester (B-2), it is preferred to use a fatty acid having 12 to 24 carbon atoms. The fatty acid as referred to herein may be either linear or branched, and saturated and unsaturated alkyl groups are included.

In addition, the carboxylic acid compound may be a monovalent carboxylic acid, such as stearic acid, oleic acid, etc., and may also be a polyvalent carboxylic acid, such as succinic acid, adipic acid, pimelic acid, azelaic acid, sebacic acid, phthalic acid, isophthalic acid, etc.

Among these carboxylic acid compounds, stearic acid and oleic acid are suitable.

A total blending amount of the component (B-1) and the component (B-2) is preferably 0.01 to 5.0% by mass, more preferably 0.02 to 2.5% by mass, and still more preferably 0.05 to 1.0% by mass on the basis of the total amount of the composition. When the total blending amount of the component (B-1) and the component (B-2) is 0.01% by mass or more, the clutch properties can be made excellent, and when it is 5.0% by mass or less, a reduction of the clutch capacity can be suppressed.

<Viscosity Index Improver>

It is preferred that the lubricating oil composition for electric vehicle or hybrid vehicle of the present invention is one further including a viscosity index improver blended therein. By blending the viscosity index improver in the lubricating oil composition, the effects of gear properties, clutch properties, and insulating properties can be readily stably exhibited in a wide temperature region.

Examples of the viscosity index improver include an olefin-based polymer, such as an ethylene-propylene copolymer, etc., a styrene-based copolymer, such as a styrene-diene hydrogenated copolymer, etc., a poly(meth)acrylate, and the like. Among those, a poly(meth)acrylate is suitable.

The monomer that constitutes the poly(meth)acrylate is an alkyl (meth)acrylate, and preferably an alkyl (meth)acrylate in which the alkyl moiety thereof is a linear alkyl group having 1 to 18 carbon atoms or a branched alkyl group having 3 to 34 carbon atoms.

Preferred examples of the monomer that constitutes the alkyl (meth)acrylate include methyl (meth)acrylate, ethyl (meth)acrylate, propyl (meth)acrylate, butyl (meth)acrylate, pentyl (meth)acrylate, hexyl (meth)acrylate, hexyl (meth)acrylate, heptyl (meth)acrylate, octyl (meth)acrylate, nonyl (meth)acrylate, decyl (meth)acrylate, dodecyl (meth)acrylate, tetra (meth)acrylate, hexa (meth)acrylate, octadecyl (meth)acrylate, and the like. Copolymers using two or more of these monomers may also be used. The alkyl group of such a monomer may be either linear or branched.

In addition, examples of the alkyl (meth)acrylate having a branched alkyl group having 3 to 34 carbon atoms include isopropyl (meth)acrylate, 2-ethylhexyl (meth)acrylate, 3,5,5-trimethylhexyl (meth)acrylate, 2-butyloctyl (meth)acrylate, 2-hexyldecyl (meth)acrylate, 2-octyldodecyl (meth)acrylate, 2-decyltetradecyl (meth)acrylate, 2-dodecylhexadecyl (meth)acrylate, and 2-tetradecyloctadecyl (meth)acrylate.

From the viewpoint of making it easy to stably exhibit the effects of gear properties, clutch properties, and insulating properties in a wide temperature region, a mass average molecular weight (Mw) of the viscosity index improver is preferably 10,000 to 50,000, more preferably 15,000 to 45,000, and still more preferably 20,000 to 40,000. In addition, when the viscosity index improver having a mass average molecular weight of 50,000 or less is used, an increase of the viscosity in a low-temperature environment can be suppressed.

In the present embodiment, the "mass average molecular weight" refers to a molecular weight as expressed in terms of polystyrene by means of the gel permeation chromatography (GPC) measurement.

The blending amount of the viscosity index improver is preferably 1.0 to 20.0% by mass, more preferably 3.0 to 15.0% by mass, and still more preferably 5.0 to 10.0% by mass on the basis of the total amount of the lubricating oil composition for electric vehicle or hybrid vehicle. When the blending amount of the viscosity index improver is 1.0% by mass or more, the aforementioned effects based on the viscosity index improver can be readily obtained, and when it is 20.0% by mass or less, an increase of the viscosity can be suppressed.

It is preferred that the lubricating oil composition for electric vehicle or hybrid vehicle of the present embodiment does not contain a viscosity index improver having a mass average molecular weight of less than 10,000 and/or a viscosity index improver having a mass average molecular weight of more than 50,000.

<Additives>

The lubricating oil composition for electric vehicle or hybrid vehicle of the present embodiment may contain additives, such as a friction modifier, an antioxidant, a dispersant, a pour-point depressant, an antifoaming agent, etc.

The blending amount of the additive is preferably 15% by mass or less on the basis of the total amount of the composition.

<Physical Properties and Application>

In the lubricating oil composition for electric vehicle or hybrid vehicle of the present embodiment, it is preferred that a Brookfield viscosity (BF viscosity) at −40° C., a kinematic viscosity at 40° C., a kinematic viscosity at 100° C., and a viscosity index fall the following ranges, respectively. In the present embodiment, the BF viscosity is one as measured in conformity with ASTM D2983-09.

From the viewpoint of exhibiting the stable effects in a low-temperature region, the BF viscosity at −40° C. is preferably 30,000 mPa·s or less, more preferably 15,000 mPa·s or less, and still more preferably 7,500 mPa·s or less.

From the viewpoint of a balance between the gear properties and the cooling properties, the kinematic viscosity at 40° C. is preferably 15 to 50 mm$^2$/s, and more preferably 20 to 40 mm$^2$/s.

From the viewpoint of a balance between the gear properties and the cooling properties, the kinematic viscosity at 100° C. is preferably 3 to 15 mm$^2$/s, and more preferably 4 to 10 mm$^2$/s.

From the viewpoint of exhibiting the stable effects in a wide temperature region, the viscosity index is preferably 100 or more, more preferably 150 or more, and still more preferably 170 to 230.

In addition, in the lubricating oil composition for electric vehicle or hybrid vehicle of the present embodiment, from the viewpoint of insulating properties, its volume resistivity is preferably $1.0 \times 10^7$ Ω·m or more, and more preferably $2.5 \times 10^7$ Ω·m or more. Although an upper limit of the volume resistivity of the lubricating oil composition for electric vehicle or hybrid vehicle is not particularly limited, it is typically about $1.0 \times 10^5$ Ω·m.

For example, when the base oil as the component (A), the synthetic oil as the component (A-1), and the polyamide (B-1) and/or polyol ester (B-2) are blended within the aforementioned suitable ranges, respectively, the volume resistivity can be made to fall within the aforementioned range.

In the present embodiment, the volume resistivity is one as measured at room temperature of 25° C. in conformity with the volume resistivity test of JIS C2101:1999.

In addition, in the lubricating oil composition for electric vehicle or hybrid vehicle of the present embodiment, from the viewpoint of gear properties, its viscosity decrease rate in the shear stability test at 100° C. by the ultrasonic method (shear stability at 100° C.) is preferably 5.0% or less, more preferably 3.0% or less, and still more preferably 2.0% or less.

The viscosity decrease rate in the shear stability test is a value obtained by measuring the kinematic viscosity at 100° C. before the shear stability test and after the shear stability test in accordance with JIS K2283:2000, followed by calculation according to the following equation (1). In addition, the shear stability test was performed based on the ultrasonic A method (JPI-5S-29) under a measurement condition for an ultrasonic irradiation time of 60 minutes at room temperature in an oil amount of 30 cc. An output voltage of the ultrasonic waves in the shear stability test was such an output voltage that the kinematic viscosity decrease rate at 100° C. reached 25% after irradiating 30 cc of a standard oil with ultrasonic waves for 10 minutes.

Shear stability (%)=(([Kinematic viscosity before the test]−[Kinematic viscosity after the test])/[Kinematic viscosity before the test])×100   (1)

The lubricating oil composition for electric vehicle or hybrid vehicle of the present embodiment can be used as a lubricating oil composition for a hybrid car or an electric car. More specifically, the lubricating oil composition for electric vehicle or hybrid vehicle of the present embodiment can be suitably used as a lubricating oil composition for a combined use of transmission and motor cooling of a hybrid car or an electric car, or as a lubricating oil composition for a combined use of reduction gears and motor cooling.

EXAMPLES

Next, the present invention is hereunder described in more detail by reference to the Examples, but it should be construed that the present invention is by no means limited by these Examples.

1. Preparation of Lubricating Oil Composition

A lubricating oil composition for electric vehicle or hybrid vehicle of each of the Examples and Comparative Examples was prepared in a composition ratio shown in Table 1.

2. Measurement and Evaluation

With respect to the lubricating oil composition of each of the Examples and Comparative Examples, the following measurements and evaluations were performed. Results are shown in Table 1.

2-1. Kinematic Viscosity

The lubricating oil composition for electric vehicle or hybrid vehicle was measured with respect to a kinematic viscosity at 40° C., a kinematic viscosity at 100° C., and a viscosity index in conformity with JIS K2283:2000.

2-2. Brookfield Viscosity (BF Viscosity)

The lubricating oil composition for electric vehicle or hybrid vehicle was measured with respect to a BF viscosity at −40° C. in conformity with ASTM D2983-09.

2-3. Gear Properties 2-3-1. FZG Gear Test

The test was performed under a condition at 90° C. and 1,450 rpm for 15 minutes in conformity with ASTM D5182-97 (2014), and a load stage at which scuffing was generated was measured.

2-3-2. Shear Stability

A kinematic viscosity at 100° C. before the shear stability test and after the shear stability test was measured in conformity with JIS K2283:2000, and a shear stability was calculated according to the following equation. In addition, the shear stability test was performed based on the ultrasonic A method (JPI-5S-29) under a measurement condition for an ultrasonic irradiation time of 60 minutes at room temperature in an oil amount of 30 cc. An output voltage of the ultrasonic waves in the shear stability test was such an output voltage that the kinematic viscosity decrease rate at 100° C. reached 25% after irradiating 30 cc of a standard oil with ultrasonic waves for 10 minutes.

Shear stability (%)=(([Kinematic viscosity before the test]−[Kinematic viscosity after the test])/[Kinematic viscosity before the test])×100

2-4. Clutch Properties

An engagement test in which an inertial plate rotating at 3,600 rpm was made stationary due to friction between a friction plate (FZ127-24-Y1) and a steel plate (FZ132-8-Y1) by using an SAE No. 2 tester (friction properties tester) was performed in conformity with JASO M348-95; and a friction coefficient $\mu_{1800}$ at a rotation rate of 1,800 rpm on the way of being made stationary and a friction coefficient $\mu_{200}$ at a rotation rate of 200 rpm just before stop were measured, and $\mu_{200}/\mu_{1800}$ was calculated. A surface pressure was set to 1 MPa, and an oil temperature was set to 100° C.

It may be said that as the $\mu_{200}/\mu_{1800}$ is small, the shift shock at the time of clutch connection is suppressed, so that the clutch properties are excellent.

2-5. Insulating Properties (Volume Resistivity)

A volume resistivity (Ω·m) of the lubricating oil composition for electric vehicle or hybrid vehicle was measured at room temperature of 25° C. in conformity with the volume resistivity test of JIS C2101:1999.

2-6: Cooling Properties

A silver rod heated at 200° C. was put into a sample oil heated at 80° C. in conformity with the "cooling properties test method: A method" as prescribed in JIS K2242:2012; a cooling curve was prepared from a temperature change on the silver rod surface, and a cooling rate (deg/s) of the cooling curve at 200° C. was calculated.

(B-1) Polyamide: A reaction product between stearic acid and aliphatic polyamine (B-2) Polyol ester: A mixture of oleic acid monoglyceride and oleic acid diglyceride Viscosity index improver 1: Polymethyl methacrylate (Mw: 30,000)

Viscosity index improver 2: Polymethyl methacrylate (Mw: 100,000)

As is clear from the results of Table 1, the lubricating oil compositions for electric vehicle or hybrid vehicle of Examples 1 to 3 could simultaneously satisfy the gear properties, the clutch properties, the cooling properties, and the insulating properties. In addition, the lubricating oil compositions for electric vehicle or hybrid vehicle of Examples 1 to 3 were able to suppress an increase of the BF viscosity at −40° C., so that the stable effects could be expected even in a low-temperature region.

On the other hand, the lubricating oil compositions for electric vehicle or hybrid vehicle of Comparative Examples 1 to 5 are ones not containing at least one of the synthetic oil (A-1) having a kinematic viscosity at 100° C. of 1.0 to 10.0 mm$^2$/s and the polyamide (B-1) and/or the polyol ester (B-2). For that reason, the lubricating oil compositions for electric vehicle or hybrid vehicle of Comparative Examples 1 to 5 could not simultaneously satisfy the gear properties, the clutch properties, the cooling properties, and the insulating properties.

TABLE 1

|  |  |  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| Composition (mass %) | (A) Base oil | (A-1) Synthetic oil | 3 | 3 | 3 | 3 | 0 | 0 | 0 | 74 |
|  |  | Other synthetic oil | 6.6 | 6.6 | 6.6 | 6.6 | 0 | 0 | 0 | 14 |
|  |  | Mineral oil | 71 | 71 | 71 | 71 | 79 | 71 | 83 | 0 |
|  | (B-1) Polyamide |  | 0.1 | 0.1 | 0 | 0 | 0 | 0 | 0.1 | 0 |
|  | (B-2) Polyol ester |  | 0.1 | 0 | 0.1 | 0 | 0 | 0 | 0.1 | 0 |
|  | Viscosity index improver 1 |  | 7 | 7 | 7 | 11 | 8 | 11 | o | 0 |
|  | Viscosity index improver 2 |  | 0 | 0 | 0 | 0 | 0.6 | 0 | 4.5 | 0 |
|  | Additives (friction modifier, antioxidant, dispersant, pour-point depressant, antifoaming agent, etc.) |  | Balance | Balance | Balance | Balance | Balance | Balance | Balance | Balance |
| Properties | Kinematic viscosity at 40° C. (mm$^2$/s) |  | 27 | 27 | 27 | 27 | 30 | 33 | 35 | 16.5 |
|  | Kinematic viscosity at 100° C. (mm$^2$/s) |  | 6.2 | 6.2 | 6.2 | 6.2 | 7.2 | 7.2 | 7.2 | 4.3 |
|  | Viscosity index |  | 192 | 192 | 192 | 192 | 218 | 192 | 180 | 185 |
|  | BF viscosity (mPa · s) |  | 6000 | 6000 | 6000 | 6000 | 6800 | 6800 | 18000 | 3000 |
| Evaluation | Gear properties | FZG gear test | 11 | 11 | 11 | 11 | 11 | 11 | 11 | 10 |
|  |  | Shear stability (%) | 1.5% | 1.5% | 1.5% | 1.5% | 5.8% | 1.5% | 14.8% | 1.5% |
|  | Clutch properties | $\mu_{200}/\mu_{1800}$ | 0.992 | 1.000 | 1.000 | 1.008 | 1.008 | 1.008 | 0.992 | 1.008 |
|  | Electric insulating properties | Volume resistivity (Ω · m) | $3.5 \times 10^7$ | $3.5 \times 10^7$ | $3.5 \times 10^7$ | $3.5 \times 10^7$ | $3.5 \times 10^7$ | $3.5 \times 10^7$ | $3.5 \times 10^7$ | $3.5 \times 10^7$ |
|  | Cooling properties (deg/s) |  | 7.5 | 7.5 | 7.5 | 7.5 | 7.0 | 7.0 | 7.0 | 8.0 |

The materials of Table 1 are as follows.
(A-1) Synthetic oil: Poly-α-olefin (polydecene, kinematic viscosity at 40° C.: 5.1 mm$^2$/s, kinematic viscosity at 100° C.: 1.8 mm$^2$/s, viscosity index: 128)
Other synthetic oil: Kinematic viscosity at 40° C.: 1,240 mm$^2$/s, kinematic viscosity at 100° C.: 100 mm$^2$/s
Mineral oil: Kinematic viscosity at 40° C.: 9.9 mm$^2$/s, kinematic viscosity at 100° C.: 2.7 mm$^2$/s

INDUSTRIAL APPLICABILITY

The lubricating oil composition for electric vehicle or hybrid vehicle of the present embodiment is useful from the standpoint that it is able to simultaneously satisfy gear properties (e.g., seizure resistance or shear stability under a high load), clutch properties (e.g., suppression of shift shock at the time of clutch connection), cooling properties, and electric insulating properties.

The invention claimed is:

1. A lubricating oil composition for electric vehicle or hybrid vehicle, which is prepared by blending a mixture comprising:
   (A) a base oil; and
   (B-1) a polyamide which is a reaction product of an aliphatic polyamine having a total carbon number 6 to 30 and a monovalent fatty acid having 12 to 24 carbon atoms of the hydrocarbon group;
   (B-2) a polyol ester which is a partial ester reaction product of a trivalent or multivalent aliphatic polyol and a fatty acid having 12 to 24 carbon atoms;
   wherein:
   the base oil (A) comprises:
      (A-1) a poly-α-olefin, a hydrogenated product of a poly-α-olefin, or a mixture thereof, having a kinematic viscosity at 100° C. of 1.0 to 10.0 mm$^2$/s,
      (A-2) a mineral oil having a kinematic viscosity at 100° C. of 1.5 to 6 mm$^2$/s, and
      (A-3) a synthetic oil having a kinematic viscosity at 100° C. of more than 10.0 mm$^2$/s and 100.0 mm$^2$/s or less;
   a blending amount of the component (A-1) is from 1.0 to 10.0% by mass on the basis of a total amount of the composition;
   a blending amount of the component (A-2) is from 60.0 to 90.0% by mass on the basis of a total amount of the composition, and
   a total blending amount of the component (B-1) and the component (B-2) is from 0.05 to 1.0% by mass on the basis of the total amount of the composition.

2. The lubricating oil composition according to claim 1, wherein the component (A-1) is the poly-α-olefin or the hydrogenated product of the poly-α-olefin.

3. The lubricating oil composition according to claim 1, wherein the blending amount of the component (A-1) is from 1.5 to 10.0% by mass on the basis of the total amount of the composition.

4. The lubricating oil composition according to claim 1, which has a kinematic viscosity at 100° C. of 3 to 15 mm$^2$/s.

5. The lubricating oil composition according to claim 1, which has a viscosity index of 100 or more.

6. The lubricating oil composition according to claim 1, which has a volume resistivity of 1.0×10$^7$ Ω·m or more.

7. The lubricating oil composition according to claim 1, which has a Brookfield viscosity at −40° C. of 30,000 mPa·s or less.

8. The lubricating oil composition according to claim 1, wherein the mixture does not include a dispersant.

* * * * *